April 28, 1964         P. D. BARLOW         3,131,279
TEMPERATURE CONTROL CIRCUIT
Filed March 17, 1960
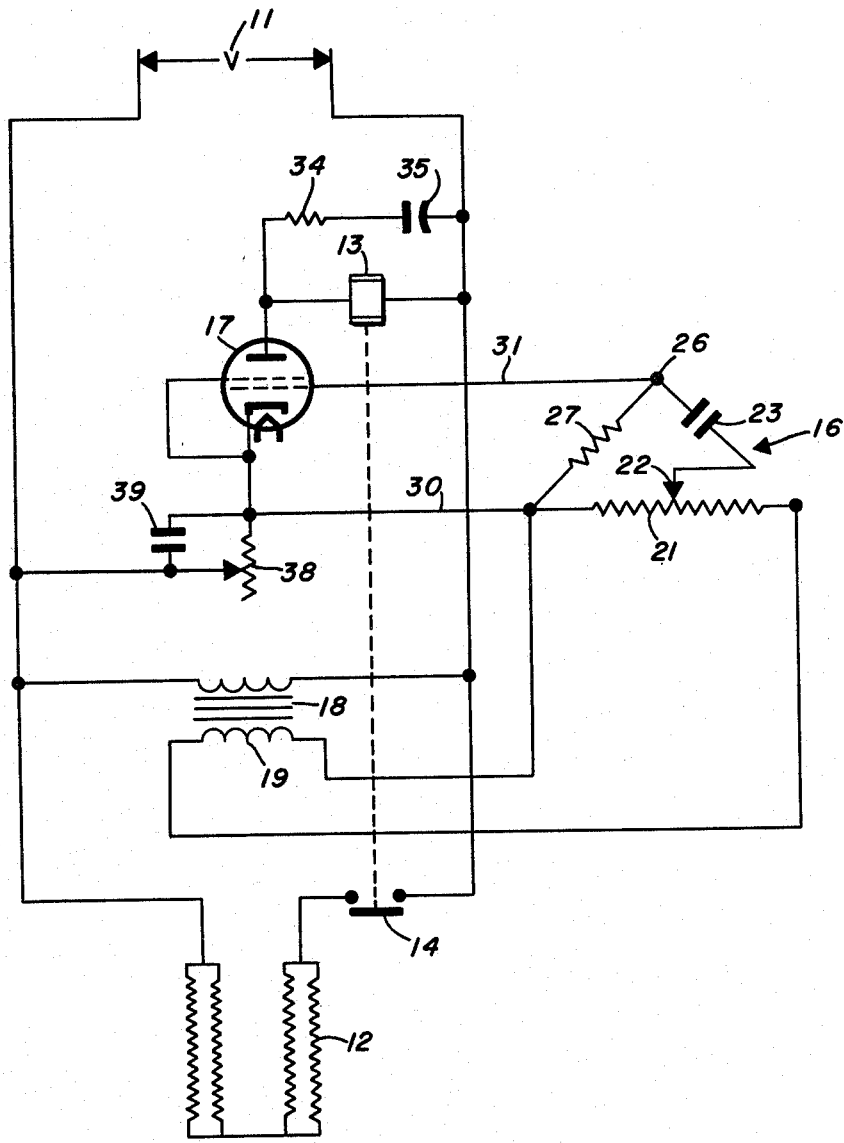
INVENTOR.
PAUL D. BARLOW
BY *Robert L. Dwad Jr.*
ATTORNEY

United States Patent Office 3,131,279
Patented Apr. 28, 1964

3,131,279
TEMPERATURE CONTROL CIRCUIT
Paul D. Barlow, Pensacola, Fla., assignor, by mesne assignments, to Monsanto Chemical Company, a corporation of Delaware
Filed Mar. 17, 1960, Ser. No. 15,579
6 Claims. (Cl. 219—20)

This invention relates to temperature control circuits, and more particularly to circuits for sensing and maintaining a temperature at a predetermined value.

One of the disadvantages of temperature controllers used in the past is that the controlled temperature could not be maintained within precise limits. In certain operations, it is desirable to provide temperatures which are accurately controlled in order that optimum results may be obtained. With this in mind, one of the objects of this invention is to provide a novel and improved temperature control circuit.

Another object of this invention is to provide a temperature control circuit wherein a sensing network controls a heater to maintain a predetermined temperature.

Still another object of this invention is to provide a temperature control circuit having a sensing network which produces an output signal having a phase which varies in response to the sensed temperature.

A further object of this invention is to provide a temperature control circuit wherein a thyratron which applies power to a heater is controlled by a phase shifting network which senses the controlled temperature.

One embodiment of the invention contemplates a temperature control circuit having a thyratron through which power is applied to actuate a heater which is provided for maintaining a temperature at a given location. A network having a capacitor and a thermistor connected in parallel is adapted to sense the temperature at the location and to control the output of the thyratron to the heater. The temperature sensing network produces a signal which varies in phase as the temperature changes. This signal is applied to control the thyratron, variations in phase in the signal controlling the conduction of the thyratron to apply varying amounts of power to the heater. In this manner, the temperature is controlled to within precise limits.

Other objects and advantages of this invention will become apparent when the following detailed description is read in conjunction with the appended drawing, in which the single figure is a schematic diagram of a circuit illustrating one embodiment of the invention.

Referring now in detail to the drawing, an A.C. power supply 11 is shown connected to an electrically operated heater 12 of a well-known type when a relay 13 closes a contactor 14. The heater 12 is provided for maintaining a predetermined temperature in a space or for maintaining a work part, solution, etc. at a desired temperature. One of the most common uses for such a heater in the synthetic fiber field is to heat a draw pin over which nylon or other yarn is drawn and stretched. This pin must be maintained at a fairly precise temperature in order to insure that the drawing operation achieves the desired results. Operation of the relay 13 is controlled by a temperature sensing network 16 having an output signal applied to control the conduction of a thyratron 17 in response to the temperature. Conduction of the thyratron 17 energizes the relay 13 to close the contactor 14, thereby connecting the heater 12 to the power supply 11.

A transformer 18 connected across the power supply 11 is provided with a secondary winding 19 connected to the temperature sensing network 16 for applying an input signal to this network. The network 16 includes a potentiometer 21 connected across the secondary winding 19 of the transformer 18 and having a tap 22 connected through a capacitor 23 to a terminal 26. One side of the potentiometer 21 is connected through a thermistor 27 to the terminal 26, the thermistor being physically located so as to sense the temperature of the pin over which the nylon yarn is being drawn. The capacitor 23 and the thermistor 27 serve as an RC phase shifting network which is responsive to temperature.

Since an A.C. input signal is applied across the potentiometer 21, an A.C. signal will appear across the thermistor 27. The phase of this signal relative to the input signal will be dependent upon the values of the capacitor 23 and the resistance of the thermistor 27. Since the resistance of the thermistor 27 changes with temperature, the phase of the output signal of the network 16 will vary in response to temperature.

The output signal of the sensing network 16 is applied to the control grid of the thyratron 17 through leads 30 and 31. The anode circuit of the thyratron 17 includes the relay 13 connected in parallel with a resistor 34 and a capacitor 35. The purpose of the resistor 34 and the capacitor 35 is to smooth the output of the thyratron 17. The cathode circuit of the thyratron 17 includes a potentiometer 38 connected in parallel with a capacitor 39, both of these elements being connected in series with the thyratron 17. The purpose of the potentiometer 38 and the capacitor 39 is to vary the voltage drop across the thyratron 17 so as to adjust the sensitivity of the operation of the relay 13.

Operation of the heater 12 is controlled by the thyratron 17, the conduction of which is controlled by the output signal of the temperature sensing network 16. If the output signal of the network 16 were in phase with the A.C. signal applied across the potentiometer 21, the thyratron 17 would conduct during every positive half cycle of the power supply 11 and no control of the heater 12 could be obtained. However, the thermistor 27 and the capacitor 23 effect a shift in the phase of the power applied across the potentiometer 21.

Thus, the input signal to the grid of the thyratron 17 is out of phase with the plate potential of the thyratron so that the thyratron will conduct to energize the relay 13 during only a portion of each positive half cycle of the power supply 11. This difference in phase is changed as the sensed temperature varies, thereby changing the duration of conduction of the thyratron during each positive half cycle of the power supply 11. Inasmuch as the phase of the output signal of the temperature sensing network 16 changes in response to temperature, the conduction of the thyratron 17 will also vary with temperature.

As the sensed temperature rises, the output signal of the network 16 is shifted relative to the phase of the A.C. supply voltage to decrease the time interval during which the thyratron 17 conducts in each positive half cycle of the A.C. supply voltage. As the temperature drops, the phase of the output signal from the network 16 is shifted in the opposite direction to allow the thyratron 17 to conduct for a greater time interval during each position half cycle of the A.C. supply voltage. In this manner, the output signal of the network 16 is phase-shifted in response to temperature to control the conduction of the thyratron 17 which in turn controls the application of electrical energy to the heater 12. As a result, the temperature of the drawing pin is controlled to within very close limits.

The tap 22 of the potentiometer 21 may be moved to vary the A.C. voltage applied across the thermistor 27 and the capacitor 23. This, of course, will vary the magnitude of the output signal of the network 16. This provides for an adjustment of the thyratron grid voltage.

The potentiometer 38 and the capacitor 39 connected in the cathode circuit of the thyratron 17 provide for adjustment of the voltage across the relay 13 when the thyratron 17 is conductive. Adjustment of the potentiometer varies the sensitivity of the relay 13. This, of course, renders the system more effective in maintaining the sensed temperature at the predetermined desirable value.

It is to be understood that this embodiment may be modified or altered and that many other embodiments may be contemplated without departing from the spirit and scope of the invention.

What is claimed is:

1. A heater control circuit, comprising an A.C. power supply, a heater, a temperature sensing network connected to the power supply and having therein a capacitance and a thermistor connected in series across the power supply in such a manner as to produce an output signal across the thermistor having a phase variable in response to temperature, a thyratron connected to the A.C. power supply and the temperature sensing network in such a manner that the conduction of said thyratron is controlled by said variable phase signal, and means operated by the thyratron for actuating the heater.

2. A heater control system, comprising a heater, a thyratron, means for applying an A.C. plate voltage to the thyratron, means actuated by conduction of the thyratron for actuating the heater, and a temperature sensing network connected to the power supply for shifting the phase thereof with variations in temperature and applying a phase shifted signal to the grid of the thyratron in such a manner that conduction of the thyratron is controlled by variations of the phase of said signal, said network including a thermistor and a capacitor connected in series across the power supply.

3. A heater control circuit, comprising an A.C. power supply, a temperature sensing network having a thermistor and a capacitor connected in series across the power supply, a thyratron, a relay connected to the thyratron, said relay and thyratron being connected in series across the power supply, a heater, means operated by the relay for connecting the heater to the power supply, and a lead connecting the sensing network to the thyratron for controlling the conduction thereof.

4. A heater control circuit, comprising an A.C. power supply, an electrically operated heater, a temperature sensing network connected to the power supply and having capacitance and a thermistor connected in series across the power supply for producing an output signal having a phase variable with temperature, a thyratron connected to the power supply and controlled by said signal of variable phase, a relay connected to the thyratron and having a contactor closable to connect the heater to the power supply, and means connected in series with the thyratron for adjusting the plate voltage thereof.

5. A heater control circuit, comprising an A.C. power supply, an electrically operated heater, a temperature sensing network having a potentiometer connected to the power supply and a capacitance and a thermistor connected in series across the potentiometer, a thyratron having the cathode and grid thereof connected across the thermistor and the cathode and plate thereof connected across the power supply, a relay connected in series with the thyratron and having a contactor closable to connect the power supply to the heater, means connected in series with the thyratron for adjusting the plate voltage thereof, and means connected in parallel with the relay for smoothing the output of the thyratron.

6. A heater control circuit, comprising an A.C. power supply, a thyratron, a relay connected in series with the thyratron across the power supply, a heater, said relay having a contactor closable to actuate the heater, a potentiometer connected across the power supply, a temperature sensing thermistor connected to one side of the potentiometer, a capacitor connected between the thermistor and the tap of the potentiometer, and a lead interconnecting the grid of the thyratron and the junction of the thermistor and potentiometer, said capacitor and and thermistor applying to the thyratron grid a control voltage having a phase variable in response to temperature.

References Cited in the file of this patent

UNITED STATES PATENTS

| 1,694,264 | Hull | Dec. 4, 1928 |
| 2,546,926 | Hart | Mar. 27, 1951 |
| 2,673,917 | Woodling | Mar. 30, 1954 |
| 2,782,246 | Evans | Feb. 19, 1957 |
| 2,838,643 | Elliot et al. | June 10, 1958 |
| 2,958,008 | Bray et al. | Oct. 25, 1960 |